United States Patent [19]

Whitney et al.

[11] Patent Number: 4,670,363

[45] Date of Patent: Jun. 2, 1987

[54] NON-AQUEOUS ELECTROCHEMICAL CELL

[75] Inventors: Thomas A. Whitney, Medfield; Donald L. Foster, Somerville, both of Mass.

[73] Assignee: Duracell Inc., Bethel, Conn.

[21] Appl. No.: 910,694

[22] Filed: Sep. 22, 1986

[51] Int. Cl.$^4$ ............................................. H01M 6/14
[52] U.S. Cl. .................................... 429/196; 429/199; 429/218
[58] Field of Search ............... 429/194, 196, 197, 199, 429/198, 218; 252/62.2

[56] References Cited

U.S. PATENT DOCUMENTS 3,764,385  10/1973  Langer et al. ................. 429/194 X
4,118,550  10/1978  Koch ............................. 429/197 X
4,526,846   7/1985  Kearney et al. ................. 429/194

Primary Examiner—Anthony Skapars
Attorney, Agent, or Firm—Ronald S. Cornell; James B. McVeigh

[57] ABSTRACT

An improved nonaqueous electrolyte and electrochemical cell containing same, wherein the electrolyte is comprised of a salt complexed by a tertiary amine and an aromatic organic solvent, the improvement being the addition of a solvent having a dielectric constant greater than 20 which provides an electrolyte having a conductivity sufficient to support current densities greater than 1 mA/cm$_2$.

20 Claims, No Drawings

NON-AQUEOUS ELECTROCHEMICAL CELL

This invention relates to an improved electrolyte composition for non-aqueous electrochemical cells. The electrolyte is comprised of a chelating agent which coordinates to the cation of the electrolyte salt and which forms a chelated salt compound that is soluble in aprotic organic solvents such as benzene or toluene. The improvement comprises the addition of a conductivity enhancer solvent to this electrolyte which results in conductivities sufficient to support current densities of greater than 1 mA/cm$^2$. In addition, these electrolytes have a minimum number of components which are reactive toward the anode and cathode. This improves the safety of cells which employ them.

Non-aqueous electrochemical cells having anodes comprised of active metals such as lithium have received much attention due to their high energy density. These systems generally use aprotic organic solvents such as ethers e.g. diethyl ether, dimethoxyethane, and tetrahydrofuran. 2-methyl tetrahydrofuran, and dioxolane. These ethers are typically mixed with a co-solvent e.g. esters such as propylene carbonate and butyrolactone etc. Solvents such as propylene carbonate form a surface film on anodes such as lithium. These films are conductive with respect to lithium ions while at the same time they protect the solvent from further reaction with the anode. In particular the film prevents the anode from reacting with the more reactive ether component which does not form a protective film.

Electrolytes of the types described above are generally undesirable for use in secondary cells. It is important not to form robust protective films on the anode in secondary cells since on recharge one must be able to efficiently plate the anode metal back onto remaining anode material. If a film is present it is difficult to carry out the plating process. U.S. Pat. No. 4,118,550 discloses alkylated tetrahydrofurans which have been demonstrated to work in secondary lithium cells. The suitability of these solvents is attributed to the fact that they are slow to form films on the anode and thus permit a reasonable number of cycles in a secondary cell. Nevertheless, Koch reports (*Science*, Vol. 204, NO. 4392, p. 499, May 1979) that even these electrolytes degrade with increasing cycle number.

Once a film forms on the anode surface the reaction between the solvent and the anode stops. The film forms a barrier to further chemical reaction. However if, during abuse of the cell, the cell gets hot enough to melt the lithium the molten lithium continually presents a fresh surface to react with solvent. This continuous reaction of solvent generates additional heat which contributes to any unsafe aspects of a cell during an abuse situation. At elevated temperature the solvent can also be oxidized by the cathode. This reaction can also contribute to the heat generated by the cell during an abuse situation. Therefore it would be desirable, with respect to safety considerations, to have an electrolyte comprised of a minimum number of chemicals that react with either lithium or the cathode, either at room temperature or at elevated temperatures.

U.S. Pat. No. 3,764,385 discloses a class of electrolytes which would have high chemical stability with respect to lithium reduction. This patent discloses electrolyte solvents which are aromatic organic compounds. These compounds lack any reactive functional groups, such as ether groups or ester groups, which are characteristic of solvents generally used in cells having anodes such as lithium. Therefore these solvents would not react with lithium at room temperature or at elevated temperature. There would be no additional generation of heat produced by the reaction of these solvents during abuse and the result would be a safer cell. The salts disclosed in this patent are complexed by an organic chelating agent. The chelating agent coordinates to the cation of a salt and actually wraps around the cation providing it with an organic shell. This permits the dissolution of the chelated salt in an organic solvent which would not ordinarily dissolve the non-chelated salt. This patent discloses a variety of salts and chelating agents. Neither the salts nor the chelating agents disclosed are reactive toward metals such as lithium. Contrary to commonly used electrolytes, the electrolytes of this patent do not form any kind of film on the anode. They do not react at room temperature and are slow to react at elevated temperature. Therefore they provide a safer cell than do conventional electrolytes. Their use however is limited because of poor conductivity.

Generally the electrolytes disclosed in U.S. Pat. No. 3,764,385 have conductivities on the order of $10^{-4}$ (ohm-cm)$^{-1}$. This would render them operable only in cells intended to be discharged at low rate. More conductive electrolytes are disclosed which use salts such as LiAlH$_4$ and LiBH$_4$. These salts cannot be used in an electrochemical cell since these salts are reducing agents and would spontaneously react with the cathode. This patent discloses higher conductivities for electrolytes which use the chelated salt in non-aromatic organic solvents such as propylene carbonate and hexamethylphosphoramide. However, these solvents are undesirable due to their reactivity. In accordance with the present invention it has been discovered that, from a safety point of view, it is necessary to use aromatic compounds of the kind herein described.

It is generally known in the art of battery manufacture that an electrolyte should have a conductivity of at least $1 \times 10^{-3}$(ohm-cm)$^{-1}$ at 25° C. to be suitable in a cell intended to operate at current densities of 1 mA/cm$^2$ and higher. It would be more advantageous to use electrolytes having conductivities of at least $4-5 \times 10^{-3}$(ohm-cm)$^{-1}$ at 25° C. Ultimately, a conductivity of $1 \times 10^{-2}$(ohm-cm)$^{-1}$ at 25° C. would be most advantageous.

The present invention is an improvement over the prior art chelated electrolytes. It has been discovered that blending a first solvent selected from the group consisting of aprotic aromatic organic solvents with a second solvent selected from the group consisting of aprotic organic solvents having a dielectric constant of at least 20 improves the conductivity so that these electrolytes are suitable for use in high rate cells. In fact, it has been discovered that a given chelate dissolved in the blended solvents has a conductivity higher than the conductivity of the same chelate dissolved in the unblended solvents. The solvents with a sufficiently high dielectric constant act as conductivity enhancers. Examples of conductivity enhancers include sulfolane, ethylene carbonate, and 3-methyl-2-oxazolidinone having dielectric constants of 43.3, 89.6, and 77.5 respectively.

A preferred choice of conductivity enhancer, from a reactivity point of view, would be sulfolane as well as the alkyl substituted sulfolanes such as 3-methylsulfolane. Sulfolane is stable toward lithium and to most cathode active substances. Sulfolane is known to be stable up to 4.5 V versus lithium and therefore would be stable in rechargeable cells which often get up to 4.5 V on recharge. An electrolyte comprised of sulfolane, toluene, and the chelated salt would be totally unreactive in both primary and secondary lithium cells. The only difficulty with sulfolane is that it is a solid at room temperature. Special procedures must be used during its purification and handling. Once the electrolyte is prepared it remains a liquid at room temperature but as the temperature drops the electrolyte becomes more viscous and less conductive, particularly below the melting point of sulfolane.

When propylene carbonate or 3-methyl-2-oxazolidinone are used in place of sulfolane the conductivity of the electrolyte is actually a little higher. Although these solvents are more reactive than sulfolane the electrolytes made from them are less reactive than electrolytes generally used in lithium cells as discussed above. In addition, these solvents are liquids at room temperature and are easier to handle than sulfolane.

The object of this invention is to provide an electrolyte for either primary or secondary alkali or alkaline earth metal containing electrochemical cells which has a minimum number of components that react with the alkali or alkaline earth metal electrode.

It is another object of this invention to provide an electrolyte which is comprised of an aprotic aromatic organic solvent and has a conductivity of at least $1 \times 10^{-3} (\text{ohm-cm})^{-1}$ at 25° C.

These objects and the features of this invention will be become clear in light of the following examples. The conductivity values given in the examples are measured by the standard technique using an ac signal of 1 kilo-Hertz(kHz). It is to be understood that the purpose of these examples is for illustration only and they are not intended to impose any limitations on the invention as claimed.

EXAMPLE 1

An electrolyte is prepared that is 0.8 molar chelated salt in 100% toluene. The chelated salt is comprised of pentamethyldiethylenetriamine(PMDT) and lithium iodide(LiI). This composition has a conductivity of $1.3 \times 10^{-5} (\text{ohm-cm})^{-1}$ at 25° C. For comparison, an electrolyte is prepared having the formulation, 0.8M LiI.PMDT in 3-methyl-2-oxazolidinone(3-Me-2-Ox). This composition has a conductivity of $6.2 \times 10^{-3} (\text{ohm-cm})^{-1}$ at 25° C. An electrolyte is now prepared in accordance with the present invention. It has a composition of 0.8M LiI.PMDT in 50/50(v/v) 3-Me-2-Ox/toluene. The conductivity of this composition is $7.2 \times 10^{-3} (\text{ohm-cm})^{-1}$ at 25° C. The conductivity is unexpectedly higher in the mixture of the aromatic solvent and the conductivity enhancer solvent when compared to each solvent separately.

EXAMPLE 2

An electrolyte is made by dissolving a chelate in 50/50(v/v) propylene carbonate/toluene. The chelate is PMDT.LiI in a concentration of 0.8M. The conductivity is $7.2 \times 10^{-3} (\text{ohm-cm})^{-1}$ at 25° C.

EXAMPLE 3

An electrolyte is made by dissolving a chelate in 50/50(v/v) sulfolane/N-methylpyrrole to a concentration of 0.8M. The chelate is PMDT.LiI. The conductivity at 25° C. is $4.5 \times 10^{-3} (\text{ohm-cm})^{-1}$.

EXAMPLE 4

An electrolyte is prepared by dissolving the chelate in a mixture of 50/50 (v/v) dioxolane/toluene. Dioxolane has a dielectric constant of 7.13. The chelate PMDT LiI is dissolved to a concentration of 0.8M. This electrolyte has a conductivity of $7.0 \times 10^{-4} (\text{ohm-cm})^{-1}$ at 25° C. This example shows that a solvent having a dielectric constant as low as 7.13 does not give the desired improvement in conductivity.

EXAMPLES 5-6

These examples use a chelate comprised of 0.8M PMDT LiAsF$_6$. The electrolyte of example 5 uses 0.8M PMDT LiAsF$_6$ in 30/70(v/v) sulfolane/toluene and has a conductivity of $4.0 \times 10^{-3} (\text{ohm-cm})^{-1}$ at 25° C. The electrolyte of example 6 uses 0.8M PMDT LiAsF$_6$ in 30/70(v/v) sulfolane/benzene and has a conductivity of $4.8 \times 10^{-3} (\text{ohm-cm})^{-1}$ at 25° C.

EXAMPLE 7-8

For example 7 an electrolyte is made by dissolving a chelate in a 50/50(v/v) mixture of N-methylpyrrole/3-Me-2-Ox. The chelate is 0.8M PMDT LiI. The conductivity of the electrolyte is $1.0 \times 10^{-2} (\text{ohm-cm})^{-1}$ at 25° C. For example 8 the chelate is tetramethylethylenediamine(TMED) LiI dissolved to a concentration of 0.8M in the same solvent mixture as example 7. The conductivity is $9.4 \times 10^{-3} (\text{ohm-cm})^{-1}$ at 25° C. This example demonstrates that conductivities on the order of $10^{-2} (\text{ohm-cm})^{-1}$ at 25° C. are possible with the claimed electrolytes.

EXAMPLE 9

An electrolyte is made by dissolving a chelate in a mixture of 10/90(v/v) 3-Me-20x/N-methylpyrrole. The chelate is 0.8M PMDT LiI. The conductivity of this electrolyte is $6.6 \times 10^{-3} (\text{ohm-cm})^{-1}$ at 25° C. This example demonstrates that as little as 10% by volume of the conductivity enhancer can be used to synergistically raise the conductivity of the electrolyte.

EXAMPLE 10

An electrolyte is prepared by dissolving a chelate in a mixture of 50/50(v/v) pyridine/sulfolane. The chelate is 0.8M PMDT LiI, the conductivity of this electrolyte is $5.1 \times 10^{-3} (\text{ohm-cm})^{-1}$ at 25° C.

EXAMPLES 11-12

Both examples use a chelate of PMDT LiBr dissolved to a concentration of 0.8 molar. Example 11 uses a solvent mixture of 3-Me-2-Ox/N-methylpyrrole 50/50(v/v) and the conductivity of the electrolyte is $6.3 \times 10^{-3} (\text{ohm-cm})^{-1}$ at 25° C. Example 12 uses a solvent mixture of 3-Me-2-Ox/toluene 50/50(v/v) and the conductivity of the electrolyte is $4.8 \times 10^{-3} (\text{ohm-cm})^{-1}$ at 25° C.

EXAMPLE 13-15

The electrolytes of these examples are tested in a ⅔A size Li/FeS$_2$ cell. The electrodes of each cell are spirally wound together with a polypropylene separator keeping them in physical separation. Each cell is discharged across an 8 ohm load at 25° C. to a 1 V cutoff. Table 1 lists the electrolyte of each example and the capacity delivered in ampere-hours by a cell containing that electrolyte under the conditions stated.

TABLE 1

| Example | Electrolyte | Capacity |
| --- | --- | --- |
| 13 | .8 M PMDT LiI 50/50 (v/v) N—methylpyrrole/sulfolane | 1.8 |
| 14 | .8 M PMDT LiAsF$_6$ 70/30 (v/v) toluene/sulfolane | 1.3 |
| 15 | .8 M PMDT LiI 30/70 3-methyl-2-oxazolidinone/N—methylpyrrole | 1.8 |

Each cell passes greater than 0.125 amperes throughout the discharge above the cutoff voltage. This corresponds to a current density of greater than 1 mA/cm$^2$ throughout the discharge.

EXAMPLE 16

A secondary cell is made having a lithium anode and a TiS$_2$ cathode. The electrolyte used is 0.8M PMDT LiBr 50/50(v/v) toluene/sulfolane. The cathode weighed 0.1 g and the discharge/charge current density is 1 mA/cm$^2$. The cell delivers 10 cycles before its capacity drops below 40% of the cell's initial capacity.

EXAMPLE 17

The reactivity of electrolytes with lithium is evaluated by employing a differential scanning calorimeter. Typically not more than 1 mg of lithium is added to 4–5–1 of electrolyte in a closed crucible. The temperature is increased at a fixed rate and the heat given off or absorbed due to reaction is measured. A conventional electrolyte, 0.75 M LiAsF$_6$ propylene carbonate/dimethoxyethane (2/1), tested in this manner begins to react at the melting point of lithium (186° C.) and gives off 1820 joules/g between this temperature and 280° C. However, 0.8M PMDT LiI 30/70(v/v) sulfolane/toluene tested in the same manner does not begin to react until 240° C. This electrolyte reacting with lithium gives off 1327 joules/g between this temperature and 440° C. Less heat is given off over a wider temperature range when compared to a conventional electrolyte. Therefore the chelate electrolyte with the conductivity enhancer is safer then a conventional electrolyte.

Chelating agents which would be operable in the present invention and are intended to be within the scope of this invention include sparteine, an N,N-di-(C$_1$–C$_4$ alkyl) bispidin, tris-2 (dimethylaminoethyl)-amine as well as compounds having formulas of the following general types:

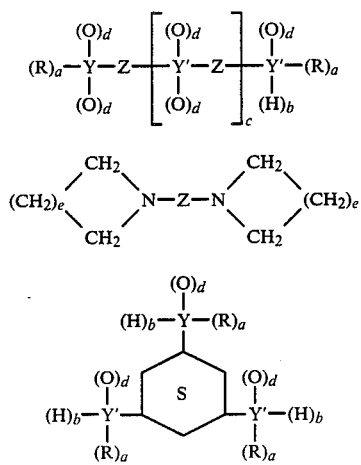

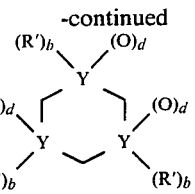

wherein a is 1 or 2, depending on the valence of Y or Y'; b is 0 or 1, depending on the valence of Y or Y'; c is an integer of 0 to 10,000, inclusive; d is 0, 1, or 2 depending on the valence of Y or Y'; e is an integer of 0 to 3 inclusive; R is the same or different C$_1$–C$_4$ alkyl radical; R' is hydrogen when d is 0 or is the same or different C$_1$–C$_4$ alkyl radical or C$_6$–C$_{10}$ aryl or arylalkyl radical when d is 0, 1, or 2; Y is a nitrogen, sulfur, or phosphorous atom; Y' is a nitrogen, oxygen, sulfur, or phosphorous atom; and Z is a nonreactive radical selected from the group consisting of (1) C$_4$–C$_{10}$ cycloaliphatic or aromatic radicals and their lower alkyl derivatives wherein said radicals are attached to the Y and Y' atoms in Formula I and the nitrogen atoms in Formula II at 1,2 positions in the aromatic rings or 1,2- or 1,3-positions on the cycloaliphatic rings; and (2) 1 to 4 methylenic radicals, wherein each methylenic radical contains 0 to 2 monovalent hydrocarbon radicals of 1 to 6 carbon atoms.

Preferably the chelating agent has (1) at least one Y being nitrogen and at least one Y' being oxygen (i.e. an aminoether) or (2) all the Y and Y' atoms being the same atom (i.e. polyamines, polyamine oxides, polyphosphines, polyphosphine oxides, polythioethers, polysulfones and polysulfoxides). It should be understood that the prefix "poly-" employed in describing the chelating agent means that the agent is a monomer or a polymer in the classical sense and that such monomer or polymer has two or more of the same functionalities.

Suitable nonlimiting examples of chelating agents falling within the scope of the above formulas are:
N, N, N', N'-tetramethyl-1,2-cyclopentanediamine,
N, N, N', N'-tetramethyl-1,2-cyclohexanediamine (cis, trans, or mixtures),
N, N, N', N'-tetramethyl-o-phenylenediamine,
4-ethyl-N', N, N', N'-tetramethyl-o-phenylenediamine,
N, N, N'', N''-tetramethyl-N-phenyl diethylenetriamine,
N, N, N', N'-tetramethyl-1,2-ethanediamine,
N, N, N', N'-tetramethyl-1,3-propanediamine,
N, N, N', N'', N''-pentamethyl-diethylenetriamine,
N, N, N', N'-tetramethyl-1,2-propanediamine,
N, N'-dimethyl-N, N'-diethyl-1,2-ethanediamine,
N, N, N', N'-tetramethyl-1-cyclohexyl-1,2-ethanediamine,
N, N, N', N'-tetramethyl-2,3-butanediamine,
N, N, N', N'-tetramethyl-1,4-butanediamine,
N,N,N',N'',N''',N'''-hexamethyltriethylenetetramine
poly-(N-ethyl-ethyleneimine),
poly-(N-methyl-ethyleneimine),
N, N, N', N'-1,8-naphthylenediamine,
beta-(dimethylamino)-ethyl methyl ether,
beta-diethylaminoethyl ethyl ether,
bis-β-(dimethylaminoethyl) ether,
beta-(dimethylamino)-ethyl ethyl ether,
gamma-(dimethylamino)-propyl methyl ether,
ortho-dimethylamino anisole,
1-dimethylamino-2-dimethylphosphino ethane,
bis-(beta-dimethylaminoethyl) methyl sulfide,
1,2-dipiperidylethane, tris-(1,3,5-dimethylamino) cyclohexane,
N, N', N''-trimethyl-1,3,5-hexahydrotriazine,
tertabutylethylenediamine dioxide,
tetramethylmethanediamine monoxide,
tetramethylethylenediphosphine dioxide,
2,5-dithiahexane-2,5-disulfone, and
2,5-dithiahexane-2,5-disulfoxide, etc.
tris-(beta-dimethylaminoethyl)amine Particularly preferred since they generally give rise to hydrogen soluble complexes, are those chelating agents which are (1) tertiary polyamines (i.e. all of the hetero atoms are tertiary nitrogen atoms) containing at least 5 carbon atoms and at least 2 tertiary nitrogen atoms and (2) tertiary aminoethers (i.e. all nitrogen atoms present are tertiary nitrogen atoms) containing at least 5 carbon atoms and at least 1 tertiary nitrogen atom and at least one ether group. Particularly preferred species of the chelating tertiary polyamines are:
N, N, N', N'-tetramethyl-1,2-ethanediamine,
N, N, N', N'-tetramethyl-1,3-propanediamine,
N, N, N', N'-tetramethyl-1,2-cyclohexanediamine (cis, trans, or mixtures),
N, N, N', N'', N''-pentamethyldiethylenetriamine,
N, N, N', N'', N''', N'''-hexamethyltriethylenetetramine,
tris-(beta-dimethylaminoethyl)amine
poly-(N-methyl ethyleneimine), etc.

The chelating agents enumerated above are capable of forming a chelate with many of the salts of alkali and alkaline earth metals. These would include the alkali and alkaline earth metal salts of chloride, bromide, iodide, $BR_4^-$ (where R=halide, alkyl, aryl, substituted aryl or mixtures thereof), hexafluorophosphate, hexafluoroarsenate, perchlorate, tetrachloroaluminate, and trifluoromethanesulfonate. Particularly preferred salts include LiI, LiCl, LiBr, $LiBF_4$, $LiB(phenyl)_4$, $LiPF_6$, $LiAsF_6$, $LiClO_4$, and $LiAlCl_4$, and $LiCF_3SO_3$.

The electrolytes of this invention are generally comprised of at least two solvents. One of the solvents is preferred to be aromatic in nature including solvents such as benzene, alkylbenzenes($C_1$–$C_{10}$), mesitylene, cumene, halobenzenes, pyridine, alkyl substituted pyridines, pyrrole, alkyl pyrroles, naphthalene, alkyl naphthalenes, indenes, and combinations thereof. Of this group single ring aromatic compounds are preferred. This would include benzene, toluene, N-methylpyrrole, xylenes, and pyridine.

The conductivity enhancer contemplated by the present invention should have a dielectric constant of at least 20. It is preferable that the conductivity enhancer have a dielectric constant of at least 30. It is most preferable that the conductivity enhancer have a dielectric constant of at least 40. Examples of this latter group includes sulfolane, 3-methylsulfolane, propylene carbonate, and 3-methyl-2-oxazolidinone. It has been discovered that there is a proportional relationship between the amount of these solvents added to an electrolyte and the resulting conductivity. The minimum amount of conductivity enhancer required is on the order of 10% by volume. Generally this amount is all that is needed to raise the conductivity of the aromatic based electrolyte above $1\times10^{-3}$(ohm-cm)$^{-1}$ at 25° C. In most cases this amount is sufficient to raise the conductivity to at least $4\times10^{-3}$(ohm-cm)$^{-1}$ at 25° C. The maximum amount of conductivity enhancer contemplated is 90%.

The electrolytes of this invention are intended for use in any electrochemical cell having an alkali or alkaline earth metal anode. Suitable cathodes for use in such cells includes $MnO_2$, $CF_x$, $V_2O_5$, $WO_3$, $MoO_3$, $MoS_2$, lead oxides, cobalt oxides, copper oxides, CuS, $CuS_2$, $In_2O_3$, iron sulfides, NiS, $Ag_2CrO_4$, $Ag_3PO_4$, $TiS_2$, niobium selenides, transition metal polysulfides, and mixtures thereof. Suitable anode materials include alkali and alkaline earth netals such as lithium, sodium, potassium, calcium, magnesium, aluminum and alloys thereof.

While embodiments of this present invention have been described in the examples set forth above, it should be understood that the invention is not limited thereto except by scope of the claims. Various modifications and changes can be made without departing from the scope and spirit of the invention as the same will be understood by those skilled in the art.

What is claimed is:

1. An improved electrolyte for an electrochemical cell, said electrolyte being comprised of an alkali or alkaline earth metal salt complexed with a monomeric or polymeric polyfunctional chelating tertiary amine containing at least two nitrogen atoms; and said electrolyte further comprising a first solvent and a second solvent; said first solvent being selected from the group of aprotic aromatic organic solvents and mixtures thereof; said second solvent being selected from the group of aprotic organic solvents having a dielectric constant of at least 20 and mixtures thereof; and said second solvent is present in an amount sufficient to raise the conductivity measured at 25° C. and 1 kHz to at least $1\times10^{-3}$ (ohm-cm)$^{-1}$.

2. The electrolyte of claim 1 wherein the second solvent is selected from the group consisting of sulfolane, 3-methylsulfolane, 3-methyl-2-oxazolidinone, and mixtures thereof.

3. The electrolyte of claim 2 wherein the first solvent is selected from the group consisting of benzene, toluene, xylenes, pyridine, N-methylpyrrole, and mixtures thereof.

4. The electrolyte of claim 3 wherein the tertiary amine is selected from the group consisting of pentamethyldiethylenetriamine, tetramethylethylenediamine, tetramethylcyclohexanediamine, hexamethyltriethylenetetramine, tris-(beta-dimethylaminoethyl)amine, and mixtures thereof.

5. The electrolyte of claim 4 wherein the salt is selected from the group consisting of the alkali or alkaline earth metal salts of iodide, bromide, chloride, hexafluorophosphate, hexafluoroarsenate, tetrachloroaluminate, $BR_4^-$ (R=fluorine, aryl, substituted aryl, and mixtures thereof), and trifluoromethane sulfonate.

6. The electrolyte of claim 5 wherein the alkali metal salts are lithium salts.

7. An electrochemical cell having an alkali or alkaline earth metal anode, a cathode, a separator, and an electrolyte; said electrolyte comprised of a salt complexed with a monomeric or polymeric polyfunctional chelating tertiary amine containing at least two nitrogen atoms; and said electrolyte further comprising a first solvent and a second solvent; said first solvent being selected from the group of aprotic aromatic organic solvents and mixtures thereof; said second solvent being selected from the group of aprotic organic solvents having a dielectric constant of at least 20 and mixtures thereof; and said second solvent is present in an amount sufficient to raise the conductivity measured at 25° C. and 1 kHz to at least $1\times10^{-3}$ (ohm-cm)$^{-1}$.

8. The electrochemical cell of claim 7 wherein the dielectric constant of the second solvent is at least 30.

9. The electrochemical cell of claim 8 wherein the dielectric constant of the second solvent is at least 40.

10. The electrochemical cell of claim 9 wherein the alkali or alkaline earth metal anode is selected from the group consisting of lithium, sodium. potassium, calcium. magnesium, aluminum, and alloys thereof.

11. The electrochemical cell of claim 9 wherein the anode is lithium.

12. The electrochemical cell of claim 11 wherein the cathode is selected from the group consisting of $MnO_2$, $CF_x$, $V_2O_5$, $WO_3$, $MoO_3$, $MoS_2$, lead oxides, cobalt oxides, copper oxides, CuS, $CuS_2$, $In_2O_3$, iron sulfides, NiS, $Ag_2CrO_4$, $Ag_3PO_4$, $TiS_2$, transition metal polysulfides, niobium selenides, and mixtures thereof.

13. The electrochemical cell of claim 12 wherein the second solvent is selected from the group consisting of sulfolane, 3-methylsulfolane, 3-methyl-2-oxazolidinone, and mixtures thereof.

14. The electrochemical cell of claim 13 wherein the first solvent is selected from the group consisting of benzene, toluene, xylenes, pyridine, N-methylpyrrole and mixtures thereof.

15. The electrochemical cell of claim 14 wherein the tertiary amine is selected from the group consisting of pentamethyldiethylenetriamine, tetramethylenediamine, tetramethylcyclohexanediamine, hexamethyltriethylenetetramine, tris-(beta-dimethylaminoethyl)amine, and mixtures thereof.

16. The electrochemical cell of claim 15 wherein the salt is selected from the group consisting of LiI, LiBr, LiCl, $LiPF_6$, $LiAsF_6$, $LiBR_4$ (R=fluorine, alkyl, aryl, substituted aryl, and mixtures thereof), $LiAlCl_4$, $LiClO_4$, and $LiCF_3SO_3$.

17. An electrochemical cell having a lithium anode, a cathode, a separator, and an electrolyte; said electrolyte comprised of a lithium salt complexed with monomeric or ploymeric polyfunctional chelating tertiary amine containing at least two nitrogen atoms; and said electrolyte further comprising a first solvent and a second solvent; said first solvent being selected from the group of aprotic aromatic organic solvents and mixtures thereof; said second solvent being selected from the group of aprotic organic solvents having a dielectric constant of at least 40 and mixtures thereof; and said second solvent is present in an amount sufficient to raise the conductivity measured at 25° C. and 1 kHz to at least $4 \times 10^{-3}$ (ohm-cm)$^{-1}$.

18. The electrochemical cell of claim 17 wherein the first solvent is selected from the group consisting of benzene, toluene, xylene(ortho, meta, and para), pyridine, N-methylpyrrole, and mixtures thereof.

19. The electrochemical cell of claim 18 wherein the second solvent is selected from the group consisting of sulfolane, 3-methylsulfolane, 3-methyl-2-oxazolidinone, and mixtures thereof.

20. The electrochemical cell of claim 19 wherein the tertiary amine is selected from the group consisting of pentamethyldiethylenetriamine, tetramethylthylenediamine, tetramethylcyclohexanediamine, hexamethyltriethylenetetramine, tris-(beta-dimethylaminoethyl)amine, and mixtures thereof.

* * * * *